United States Patent [19]

Schmitt

[11] Patent Number: 5,052,914

[45] Date of Patent: Oct. 1, 1991

[54] AUTOMATABLE INTERNAL ENDLESS FILM PARTING TOOL

[75] Inventor: Peter J. Schmitt, Ontario, N.Y.

[73] Assignee: Xerox Corporation, Stamford, Conn.

[21] Appl. No.: 560,827

[22] Filed: Jul. 31, 1990

[51] Int. Cl.$^5$ .............................................. B29C 41/42
[52] U.S. Cl. ...................................... 425/438; 425/444
[58] Field of Search ............... 425/403.1, 436 R, 422, 425/438, 444, 472, 425, 435, 186

[56] References Cited

U.S. PATENT DOCUMENTS

| | | | |
|---|---|---|---|
| 3,290,724 | 12/1966 | Rondum | 425/444 |
| 3,947,208 | 3/1976 | Broderick | 425/436 R |
| 3,966,386 | 6/1976 | Beyer-Olsen et al. | 425/436 R |
| 4,212,622 | 7/1980 | Kikuchi et al. | 425/444 |
| 4,795,124 | 1/1989 | Nagai | 249/66.1 |

FOREIGN PATENT DOCUMENTS 47-19338 6/1972 Japan .

Primary Examiner—Willard E. Hoag
Attorney, Agent, or Firm—Oliff & Berridge

[57] ABSTRACT

An automatable tool can part an internal endless film from a mold. A preferred embodiment includes a lead member and a lap member having parallel axes, and rotating about an axis intermediate to their axes. The lead member may be provided with a separation tip used to initiate separation of a film from a mold. A trailer member can also be provided and all three members are inserted internal to a mold. The lead member is inserted so as to be on the outside of the film while the lap member and trailer member remain internal to the film. Upon rotation of a connection means between the lead and lap members, the film is wound up on the tool so that it may be removed from the mold.

17 Claims, 2 Drawing Sheets

AUTOMATABLE INTERNAL ENDLESS FILM PARTING TOOL

FIELD OF THE INVENTION

The present invention relates to a method and apparatus for removing an endless film from the interior surface of a mold.

BACKGROUND OF THE INVENTION

Internal endless films are generally manually removed from cylindrical molds or female mandrels (the terms will be used interchangeably here) on which they are formed. The separation is initiated with a sharp object such as a razor blade corner, knife edge or finger nail. The process is difficult, time consuming and may damage both the film and the mandrel. After the initial separation, an entire hand and arm are forced between the film and the mandrel axially to separate the film from the mandrel. The film is then axially folded in half and then into quarters and removed from the inside of the mandrel by hand.

Extensive handling of an endless film may damage the film, especially when a very thin film is to be removed. Fingerprints, perspiration and oils may contaminate the film, rendering it damaged and unusable. Endless film to be used in electrophotographic and electrostatographic applications is especially sensitive to such damage. Many other applications require a film virtually free of defects and contaminants. Other problems with such manual methods include the formation of creases, tears and scratches in the film. The process is also slow and costly due to the manual labor involved.

U.S. Pat Nos. 3,947,208, 3,966,386 and 4,795,124 and Japanese Publication No. 47-19338 disclose various methods of removing a molded article from a mold by gripping the article and retracting it from the mold. While all of these methods are automatable, the apparatus are inapplicable to the removal of an endless film from the inner surface of a mold.

A need therefore exists for a film parting tool which will not damage a film to be removed from the inner surface of a mold. A need also exists for a film parting tool which is automatable, simple, effective and inexpensive.

SUMMARY OF THE INVENTION

It is an object of the present invention to provide an automatable internal endless film parting tool which overcomes the above-mentioned disadvantages.

It is a further object of the invention to provide an internal endless film parting tool which is automatable, simple and which will not damage a film in use.

It is a further object of the invention to provide a method of removing an internal endless film from the interior surface of a mold through the use of an endless film parting tool.

These and other objects are accomplished according to the present invention by providing a device comprising members which may be inserted internally to a mold. Preferably, at least one of the members is specially adapted to initiate separation of the film from the mold. The members are used to wind up the film within the mold so as to enable removal of the film from the mold.

DETAILED DESCRIPTION OF PREFERRED EMBODIMENTS

Figure 1:
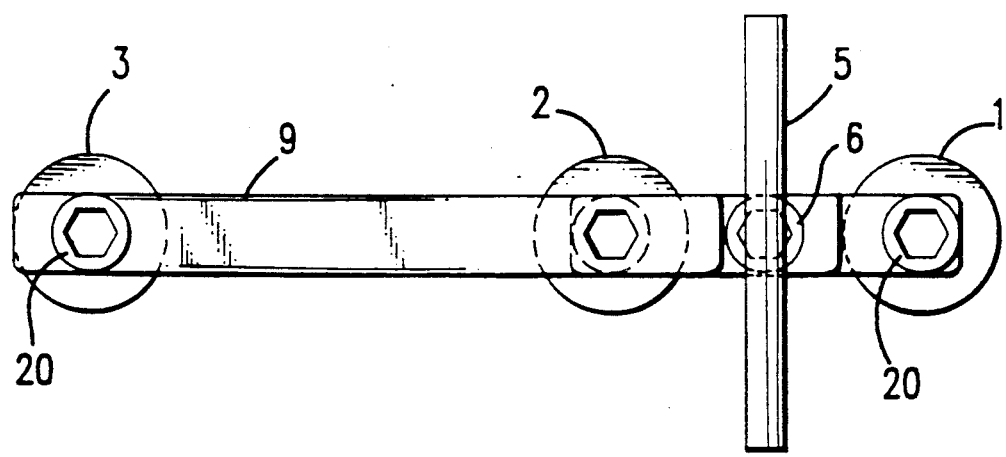
FIG. 1 is a top view of an internal endless film parting tool according to an embodiment of the present invention.

The present invention relates to a method and apparatus for parting an endless film from the interior surface of a mold. The device comprises a mechanism which initiates parting of a film from a mold and a mechanism which removes the entire film from the surface of the mold. The apparatus and method are designed to avoid causing any damage to the film or the mold surface.

The initial separation of the film from the mold surface may be achieved through a variety of mechanisms. These include, for example, pressurized fluid assist means and mechanical means. Preferably, a lead member having a knife point or acute tip is used to pry the film away from the mold surface as it is inserted between the film and the mold surface. Once the lead member initiates separation, it is preferably moved toward the interior of the mold (e.g., toward the axis of a cylindrical mold) so that the lead member does not contact the mold surface during the complete insertion of the lead member between the film and the mold surface. Once the lead member is completely inserted, it is manipulated to provide complete separation of the film from the surface of the entire mold.

The manipulation of the lead member may be performed in conjunction with manipulation of a plurality of other members which may be relatively stationary or movable. Preferably, at least two members are used to wind a film. When inserted into the mold, the two members rest on opposite sides of the film surface. In addition, one or more stationary members may be used if necessary to tension the film on the tool. The two members, resting on opposite sides of a film surface, are rotated about an intermediate axis to wrap the film onto the tool. The rotation of these members may be by manual or automatic means. The automatic means may include robotic assemblies, simple servo motors, or any other rotary actuator means powered by any conventional power source.

The entire device may be inserted and removed with respect to the mold either manually or automatically. In either case, the apparatus may be provided with a track along which the tool may be guided along a predetermined course in relation to the mold surface.

One significant advantage of the present invention is that the tool may be connected to automatable means, thus obviating the need for any handling of the tool or film. In a completely automated system, robotic assemblies may be used to insert the tool into a mold, actuate rotation of a film collecting assembly to wind the film, to remove the tool from the mold, and to transport and/or store the film for future use, processing or sale.

When a tool is to be used manually, a handle may be provided in conjunction with the film collecting assembly. Rotation of the handle thus can wind the film onto the tool.

The members are preferably rolls and the film collecting assembly preferably comprises a lead roll and a lap roll. The lead roll is inserted between a film and an interior surface of a mold, and is rotated about an axis parallel to the mold axis so as to part the film from the mandrel and wind it onto the device. The lead roll works in conjunction with a lap roll which is internal to the film so as to provide a winding action on the film. A third, trailer roll, may be used to tension the film while it is being wound around the lead and lap rolls.

Figure 2:
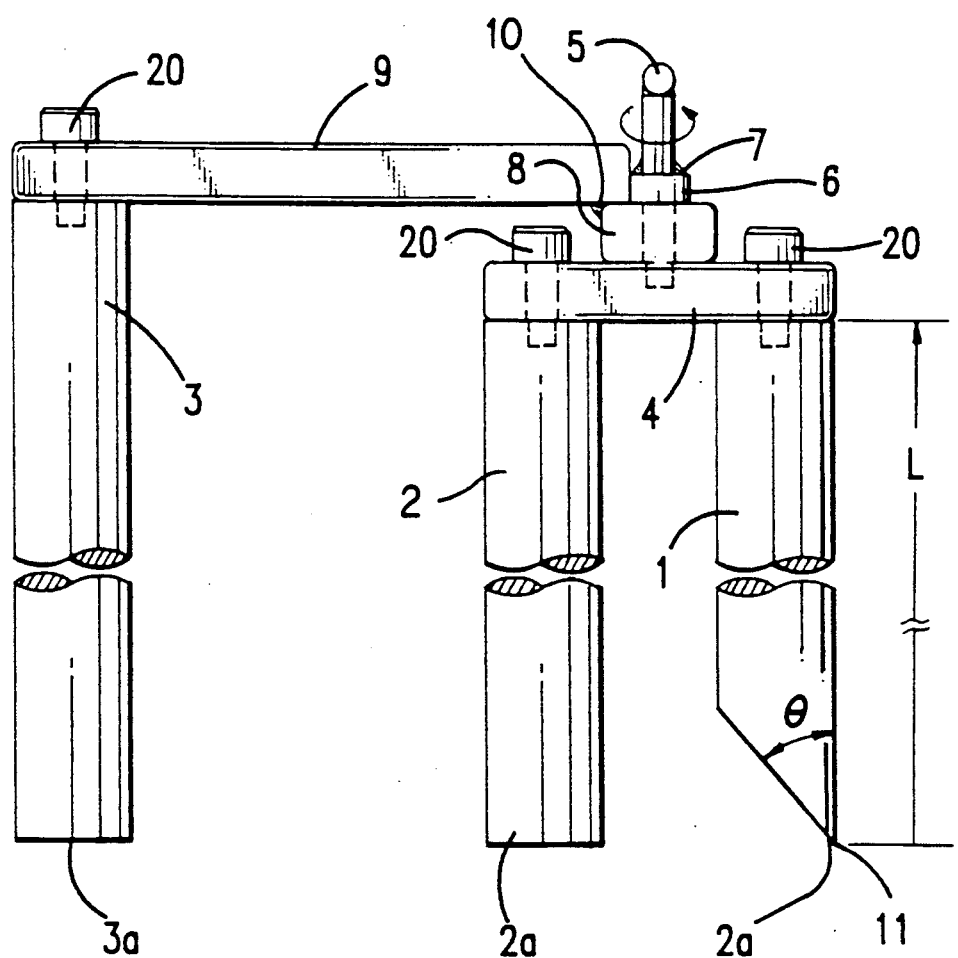
FIG. 2 is a side view of the tool of FIG. 1.

As shown in FIGS. 1 and 2, an internal endless parting tool according to one embodiment of the present invention comprises three rolls, a lead roll 1, a lap roll 2 and a trailer roll 3. The lead roll 1 and the lap roll 2 are connected to a common connection bar 4 which has two holes therethrough to accommodate mounting of the rolls, e.g., by shoulder screws 20. The shoulder screws 20 are inserted into bores at the upper end of each roll and are preferably threaded. The connection bar 4 is linked to a twist handle 5 through a captured pivot screw 6 onto which the twist handle 5 is attached. The handle 5 may be attached to the pivot screw 6 as shown at weld 7 in FIG. 2 or by other suitable attachment means. Rotation of the twist handle 5 causes rotation of the connection bar 4 to which the captured pivot screw 6 is mounted, and thus rotation of the rolls 1 and 2 about an intermediate axis defined by the captured pivot screw 6. Mounting means other than screws may, of course, be used to mount the rolls on their respective bars either permanently or removably. Preferably, the means are removable to simplify replacement of parts. The captured pivot screw 6 may be inserted through an offset spacer 8 as shown in FIG. 2. The offset spacer acts as a washer or journal permitting free rotation of the connection bar 4 and its accompanying lead roll and lap roll about an axis defined by the captured pivot screw 6. The offset spacer 8 is provided as an extension of a gripper bar 9 onto which is mounted the trailer roll 3 at an end opposite the offset spacer. The trailer roll 3 may be rotatably mounted on the gripper bar 9 by any suitable mounting means, e.g., a threaded shoulder screw 20, which passes through a bore in the gripper bar 10. Alternatively, the trailer roll may be integrally formed as an extension of the gripper bar.

The offset spacer 8 is attached to an end of the gripper bar 9 opposite the end of the gripper bar at which the trailer roll is located. The offset spacer may be integrally formed as part of the gripper bar or alternatively may be attached to the gripper bar by means which may include welds 10 as shown. The offset spacer 8 is provided to allow clearance of the shoulder portions of shoulder screws 20 under the gripper bar 9 upon rotation of the connection bar 12 which is actuated by rotation of the twist handle 5. The offset spacer 8 is provided with a bore through which the captured pivot screw 6 may threadedly engage the connection bar 4.

The lead roll 1 of the Figures is provided with a pointed end defined as a separation tip 11 which is used to initially separate a film from a mold, preferably from a female mandrel. According to one embodiment of the present invention, the separation tip initially enters a small recess in the surface portion of a mandrel on which the film is formed. As the parting tool is lowered into the internal portion of the mandrel, the separation tip pulls the film from the mandrel surface to promote separation. The lead angle θ of the separation tip 11 is preferably between 5° and 30°. A lead angle of approximately 15° is most preferred.

Once separation of the film from the mandrel is initiated, the lead roll 1 and separation tip 11 are pulled away from the mandrel surface toward the center of the mandrel so as to separate the film from the mandrel without actual contact between the mandrel surface and the separation tip. Alternatively, the twist handle may be actuated to rotate a few degrees when separation is initiated in order to move the lead roll 1 and separation tip 11 slightly away from the mandrel surface. The separation tip 11 may cause slight damage to the edge of the film upon the initial separation of the film from the mandrel. Most films, however, are provided with a scrap section at their upper and lower edges which are cut off of the film to form a final film product.

The lengths L of the lead roll and lap roll are preferably the same and are preferably at least as long as the width of a belt to be separated from a mandrel. Most preferably, the rolls are longer than the width of a belt to be separated. The trailer roll has a length which is slightly greater than that of the lead roll or lap roll so that the bottom ends 1a, 2a and 3a of the three rolls are flush with respect to each other.

Release coatings may be used on the mandrel surface prior to applying a film to the mandrel surface so as to facilitate removal of the film from the mandrel. Alternative methods for initially separating the film from the mandrel may include a fluid assist means located at the separation tip. A pressurized fluid may be provided from a source through a conduit in the lead roll. The pressurized fluid can exit the separation tip and aid in the initial separation of a film from its mandrel.

Figure 3:
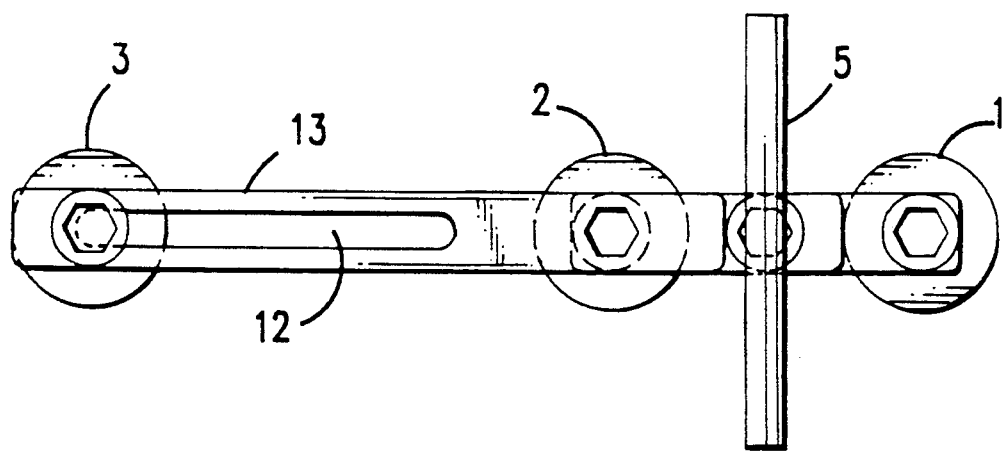
FIG. 3 is a top view of an internal endless film parting tool according to an alternative embodiment of the present invention.

FIG. 3 shows an internal endless film parting tool according to an alternative embodiment of the present invention. In this embodiment, an adjustment slot 12 is formed or cut into the gripper bar 13 to provide a track along which the trailer roll 3 may be adjustably positioned. In this way, the film parting tool may be utilized in different molds and mandrels having different sizes and diameters. Also, the trailer roll may be moved along the track as the film is unwound from the lead and lap rolls so as to maintain tension on the film during unwinding of the rolls and when the film is in an unwound state. This is particularly important when keeping a film in storage on the tool for any extended period of time and is also preferred for holding the film prior to any subsequent processing.

Figure 4:
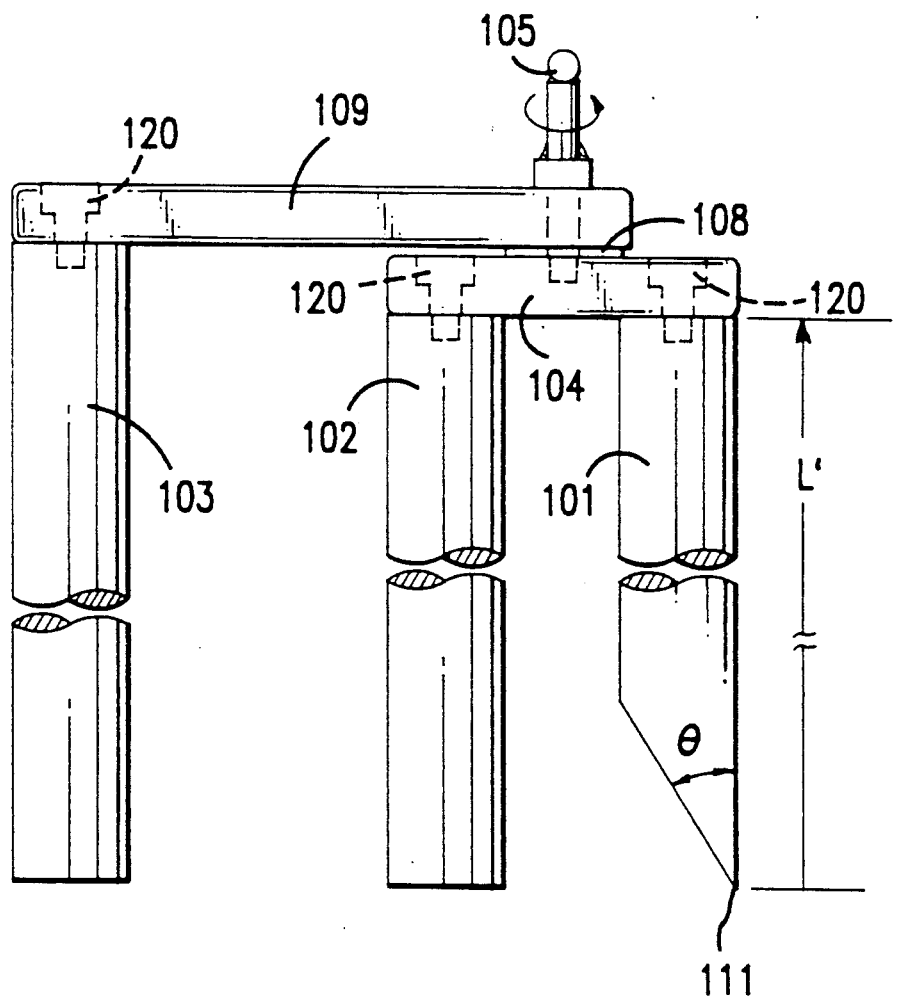
FIG. 4 is a side view of an internal endless film parting tool according to an alternative embodiment of the present invention.

FIG. 4 shows an internal endless film parting tool according to an alternative embodiment of the present invention. In this embodiment, the shoulder screws 120 used to hold the lead roll 101 and the lap roll 102 to the connection bar 104 have been recessed into recesses formed or cut into the connection bar 104. Because these shoulder screws 120 are recessed, very little clearance is necessary between the connection bar 104 and the gripper bar 113. This embodiment eliminates the need for an offset spacer. Instead, a simple washer 108 or the like may be used to provide sufficient separation between the connection bar 104 and the gripper bar 109. The captured pivot screw 122 is threadedly mounted to the connection bar 104 and passes through a hole in the gripper bar 109. The twist handle 105 is used to rotate the connection bar 104 as described for the embodiment of FIG. 2. In FIG. 4, the trailer roll 103, separation tip 111 and lead angle θ may be substantially the same as shown in the embodiment of FIG. 2. The lengths L' of the lead roll and lap roll in the embodiment of FIG. 4 may be substantially the same as the lengths L of the lead roll and lap roll in the embodiment of FIG. 2. In the embodiment of FIG. 4, an adjustment slot may also be provided in the gripper bar 109.

Once initial separation of a film from a mold is achieved and the parting tool is inserted into the mold, the lead roll rests external to the film and the lap roll rests internal to the film. The twist handle is rotated, causing the film to wrap around the lead roll and lap roll and to become tensioned on the trailer roll, facilitating removal of the film from the mold while the film is wrapped on the tool. The trailer roll may not be needed in the case of certain levels of adhesion between the film and the mold coupled with appropriate sized molds. After removal of the film from the mold, the twist handle may be rotated in an opposite direction to loosen the film so that it may be mounted on a bullet nose mounting device or other finishing station or transported and stored at any subsequent station. The film may also be automatically packaged for sale or use upon removal from the mold, provided it is a finished product. Sleeves, bearings, journals and washers may be employed for the shoulder screws and captured pivot screw as well as for the adjustment slot to facilitate smooth movement of all rotating and movable parts.

The gripper bar and connection bar may be made, for example, from a hard plastic, hard rubber, or metal. Preferably, the gripper bar and connection bar are made of a molded plastic so as to minimize cost and weight.

The three rolls are preferably made of any rigid substance which is not tacky, even at high temperatures. Rigid thermoplastic materials are preferred. The rolls may be constructed of metal, however, if the lead angle is metal it may scratch the mandrel surface. Hard polycarbonate resins such as Lexan (available from General Electric Co.) have been successfully used.

Devices according to the present invention may be manually operated to remove a film from a mold. Preferably, however, they are connected to automatic means for insertion and removal of the device into and out of a mold, for separation of a film from the mold, and for rotation of the connection bar to wrap the film on the tool. One embodiment according to the present invention involves connecting a robotic arm to the gripper bar for insertion and removal of the entire tool into and out of the mandrel. A servo motor may be used to actuate the rotation of the twist handle and may or may not be separate from the robotics controlling the robotic arm. Any means of powering the servo motor may be used, such as electric, hydraulic, air, solar and gas powered motors. The need for a twist handle may be obviated if an alternative rotational actuation means is provided for the connection bar. These means may include rotational actuation means directly or indirectly acting on the captured pivot screw. These means may include gears, grooves and the like.

Although the methods and apparatus in accordance with the present invention have been described in connection with preferred embodiments, it will be appreciated by those skilled in the art that additions, modifications, substitutions and deletions not specifically described may be made without departing from the spirit and scope of the invention defined in the appended claims.

I claim:

1. A tool for removing an endless film from an interior surface of a mold, said tool comprising:
    a) initial separation means for initiating separation of an endless film from an interior surface of a mold; and
    b) a film collecting assembly, comprising means for winding up said film.

2. A tool as in claim 1 wherein said film collecting assembly comprises means for completing separation of said film from said interior surface.

3. A tool as in claim 2, wherein said film collecting assembly comprises a lead member and a lap member having axes substantially parallel to each other, said lead member and lap member being revolvable about an intermediate axis substantially parallel to and between said lead member axis and said lap member axis.

4. A tool as in claim 3, wherein said film collecting assembly further comprises a trailer member having an axis substantially parallel to said lead member axis and said lap member axis.

5. A tool as in claim 3, wherein said lead member and said lap member are mounted on and diametrically spaced apart on a first connection member, and wherein said first connection member is rotatable about said intermediate axis to cause said lead member and said lap member to revolve about said intermediate axis.

6. A tool as in claim 5, further comprising a second connection member, said trailer member being mounted on said second connection member at a first location and said first connection member being rotatably mounted on said second connection member at a second location.

7. A tool as in claim 6, wherein said trailer member is rotatably mounted on said second connection member.

8. A tool as in claim 3, wherein said lead member and said lap member are rotatable about their respective axes.

9. A tool as in claim 5, further comprising a rotational actuator for rotating said first connection member.

10. A tool as in claim 4, wherein at least one of said lead member, lap member and trailer member is made of a rigid thermoplastic material.

11. A tool as in claim 4, wherein each of said lead member, lap member and trailer member has a length substantially as long as a cylindrical mold from which said tool is used to part an endless film.

12. A tool as in claim 3, wherein said means for initiating separation comprises said lead member, and said lead member terminates in a point which is insertable between said film and said interior surface of a mold.

13. A tool as in claim 12, wherein said point is defined by an angle of from 5°—30°.

14. A tool as in claim 13, wherein said point is defined by an angle of about 15°.

15. A tool as in claim 6, wherein said trailer member is adjustably mounted on said second connection member so that a distance between said first location and said second location can be adjusted.

16. A tool as in claim 9, further comprising means for automatically effecting rotation of the rotational actuator.

17. A tool as in claim 1, further comprising means for automatically inserting and withdrawing said tool into and out of a mold.

* * * * *